(12) United States Patent
Newport et al.

(10) Patent No.: US 7,996,401 B2
(45) Date of Patent: Aug. 9, 2011

(54) INSERTING NEW TRANSACTIONS INTO A TRANSACTION STREAM

(75) Inventors: William Thomas Newport, Rochester, MN (US); John Joseph Stecher, Rochester, MN (US); Robert Wisniewski, Rochester, MN (US)

(73) Assignee: International Business Machines Corporation, Armonk, NJ (US)

( * ) Notice: Subject to any disclaimer, the term of this patent is extended or adjusted under 35 U.S.C. 154(b) by 1104 days.

(21) Appl. No.: 11/755,809

(22) Filed: May 31, 2007

(65) Prior Publication Data

US 2008/0301682 A1 Dec. 4, 2008

(51) Int. Cl.
*G06F 7/00* (2006.01)
*G06F 17/30* (2006.01)
(52) U.S. Cl. ........................................................ 707/736
(58) Field of Classification Search .................... 707/736
See application file for complete search history.

(56) References Cited

U.S. PATENT DOCUMENTS 6,546,553 B1 * 4/2003 Hunt .............................. 717/174
* cited by examiner

*Primary Examiner* — Greta L Robinson
*Assistant Examiner* — Jeffrey Chang
(74) *Attorney, Agent, or Firm* — Owen J. Gamon

(57) ABSTRACT

In an embodiment, a selection of an original transaction is received. In response to the selection of the original transaction, a call stack of the application that sends the original transaction during a learn mode of the application is saved. A specification of a new transaction and a location of the new transaction with respect to the original transaction in an transaction stream is received. During a production mode of the application, the original transaction is received from the application. A determination is made that the call stack of the application during the production mode matches the saved call stack of the application during the learn mode. In response to the determination, the new transaction is inserted at the location into a transaction stream that is sent to a database.

20 Claims, 6 Drawing Sheets

INSERTING NEW TRANSACTIONS INTO A TRANSACTION STREAM

FIELD

An embodiment of the invention generally relates to inserting transactions into a transaction stream sent to a database.

BACKGROUND

Fundamentally, computer systems are used for the storage, retrieval, manipulation, and analysis of data. Computer systems typically include a combination of hardware (e.g., semiconductors, circuit boards, etc.) and software (e.g., computer programs). The software includes instructions that execute on (or are performed by) the hardware, in order to store, retrieve, manipulate, and analyze the data.

Some software applications (often called legacy applications) were developed or written many years ago. These legacy applications are often stable and reliable after having been fully tested over years of use. Often, users would like to add new functions to or change existing functions in the legacy applications. But, they may be reluctant or unable to modify the legacy applications because the source code (from which the instructions were created) no longer exists, the programmers who created the legacy applications are gone, or the risk of introducing errors into a reliable and important application is high. Thus, modifying legacy applications can be expensive, time-consuming, error-prone, and frustrating.

Hence, what is needed is an enhanced technique for modifying legacy applications.

SUMMARY

A method, apparatus, system, and storage medium are provided. In an embodiment, a selection of an original transaction is received. In response to the selection of the original transaction, a call stack of the application that sends the original transaction during a learn mode of the application is saved. A specification of a new transaction and a location of the new transaction with respect to the original transaction in an transaction stream is received. During a production mode of the application, the original transaction is received from the application. A determination is made that the call stack of the application during the production mode matches the saved call stack of the application during the learn mode. In response to the determination, the new transaction is inserted at the location into a transaction stream that is sent to a database. In various embodiments, the location of the new transaction is before, after, or instead of the original transaction in the transaction stream. In various embodiments, the call stacks of the learn mode and the production mode match if the method names in the call stacks match, if the call order of the method names in the call stacks match, if the return addresses of the methods match, if the parameters in the call stacks match, or if the local variables in the call stacks match. In this way, the transactions that an application sends can be modified without modifying the methods of the application.

BRIEF DESCRIPTION OF THE DRAWINGS

Various embodiments of the present invention are hereinafter described in conjunction with the appended drawings.

It is to be noted, however, that the appended drawings illustrate only example embodiments of the invention, and are therefore not considered limiting of its scope, for the invention may admit to other equally effective embodiments.

DETAILED DESCRIPTION

Figure 1:
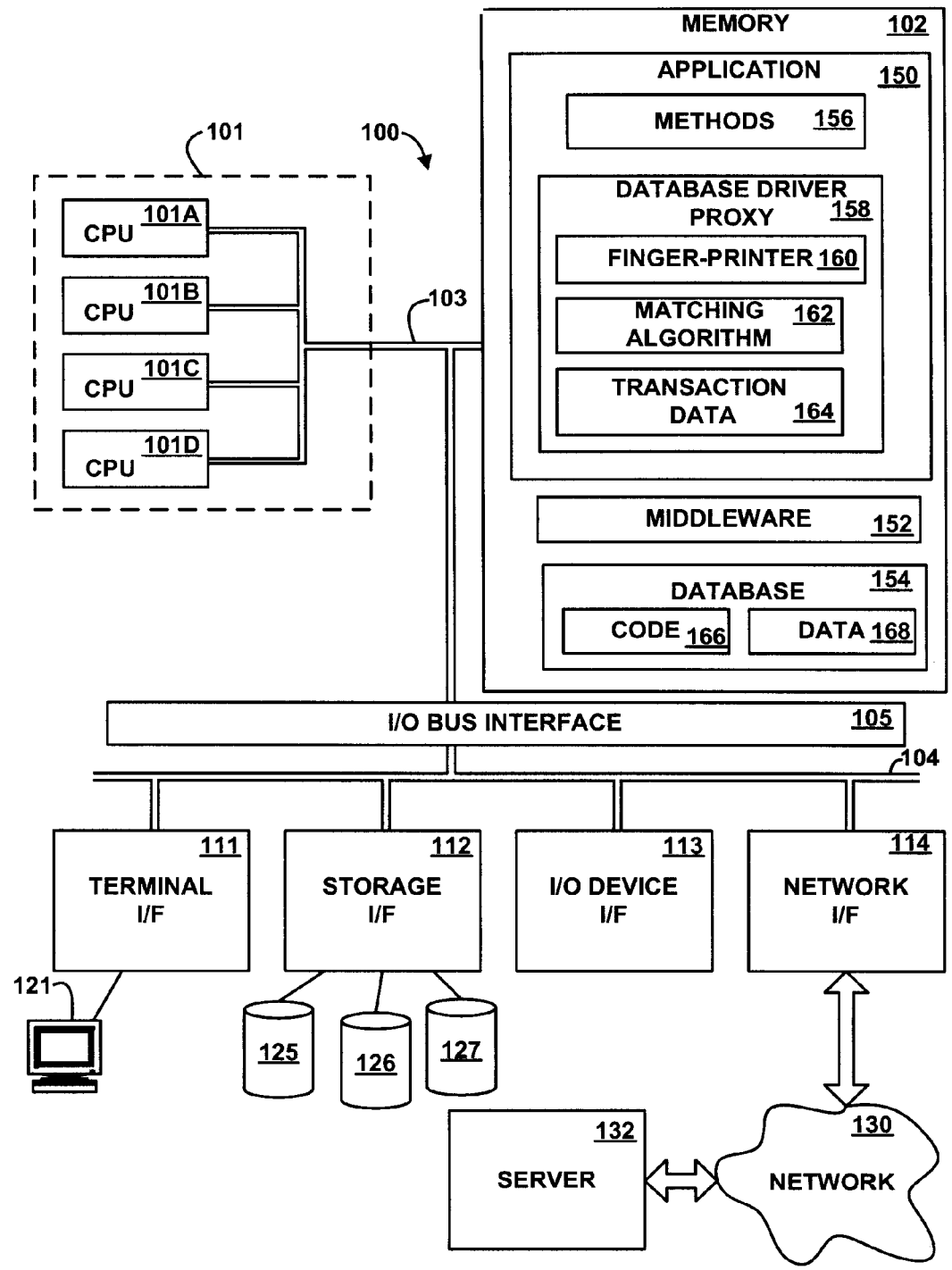
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected to a server computer system 132 via a network 130, according to an embodiment of the present invention. The term "server" is used herein for convenience only, and in various embodiments a computer system that operates as a client in one environment may operate as a server in another environment, and vice versa. In an embodiment, the hardware components of the computer systems 100 and 132 may be implemented by IBM System i5 computer systems available from International Business Machines Corporation of Armonk, N.Y. But, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and a network adapter 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing or encoding data and programs. In another embodiment, the main memory 102 represents the entire virtual memory of the computer system 100, and may also include the virtual memory of other computer systems coupled to the computer system 100 or connected via the network 130, e.g., the server 132. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes an application 150, middleware 152, and a database 154. Although the application 150, the middleware 152, and the database 154 are illustrated as being contained within the memory 102 in the computer system 100, in other embodiments some or all of them may be on different computer systems (e.g., the server 132) and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the application 150, the middleware 152, and the database 154 are illustrated as being contained within the main memory 102, these elements are not necessarily all completely contained in the same storage device at the same time. Further, although the application 150, the middleware 152, and the database 154 are illustrated as being separate entities, in other embodiments some of them, portions of some of them, or all of them may be packaged together.

The application 150 includes methods 156 and a database driver proxy 158. The database driver proxy 158 includes a finger-printer 160, a matching algorithm 162, and transaction data 164. The transaction data 164 is further described below with reference to FIG. 2.

In an embodiment, any, some, or all of the methods 156, the finger-printer 160, the matching algorithm 162, and/or the middleware 152 include instructions capable of executing on the processor 101 or statements capable of being interpreted by instructions that execute on the processor 101, to carry out the functions as further described below with reference to FIGS. 3, 4, 5, and 6. In another embodiment, any, some or all of the methods 156, the finger-printer 160, the matching algorithm 162, and/or the middleware 152 are implemented in hardware via logical gates and other hardware devices in lieu of, or in addition to, a processor-based system.

The database 154 is also known as a database management system. The database 154 includes code 166 and data 168. The code 166 provides a mechanism for managing, storing, and retrieving the data 168. In an embodiment, the code 166 includes instructions capable of executing on the processor 101 or statements capable of being interpreted by instructions that execute on the processor 101. In various embodiments, the data 168 may be implemented as numbers, audio, video, images, text, characters, BLOB data (Binary Large Object Data), instructions, statements, control codes, formatting codes, or any multiple or combination thereof.

In an embodiment, the database 154 is implemented as a relational database, which organizes the data 168 into tables that have rows, which represent individual entries, tuples, or records in the database, and columns, fields, or attributes, which define what is stored in each row, entry, or record. Each table has a unique name within the database and each column has a unique name within the particular table. The relational database also has an index, which is a data structure that identifies the location of a certain row in a table given an indexed column value, analogous to a book index informing the reader on which page a given word appears. The power of the relational database flows from the fact that the relational database model uses a mathematical representation for its data, where relationships exist within the data, but the data itself is not tied to any particular view of the data or method of accessing the data. Thus, accessing the data does not rely on any built-in navigational information within the data itself, and the actions, procedures, or modules that access the data are separate from the data. Thus, the relational data may be freely indexed, queried, and accessed as a whole.

In another embodiment, the database 154 is implemented as an object-oriented database, which flows from an object-oriented programming model. Object-oriented databases organize the code 166 (known as methods) and the data 168 together as objects. The object is said to encapsulate the data, and the data may only be accessed via the methods of its encapsulating object. The power of the object-oriented model flows from the simplification of the design process in creating object-oriented programs because people naturally think in terms of a subject performing an action on an object.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interface) bus, or any other appropriate bus technology.

The I/O interface units support communication with a variety of storage and I/O devices. For example, the terminal interface unit 111 supports the attachment of one or more user terminals 121, which may include user output devices (such as a video display device, speaker, and/or television set) and user input devices (such as a keyboard, mouse, keypad, touchpad, trackball, buttons, light pen, or other pointing device).

The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127, as needed.

The I/O device interface 113 provides an interface to any of various other input/output devices or devices of other types, such as printers or fax machines. The network adapter 114 provides one or more communications paths from the computer system 100 to other digital devices and the computer systems 132; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact, the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 may be a multi-user "mainframe" computer system, a single-user system, or a server or similar device that has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100 and the server computer systems 132. In various embodiments, the network 130 may represent a storage device or a combination of storage devices, either connected directly or indirectly to the computer system 100. In an embodiment, the network 130 may support the Infiniband architecture. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

The server computer system 132 may include any, some, or all of the hardware components and/or the software components previously described above as being included in the computer system 100.

It should be understood that FIG. 1 is intended to depict the representative major components of the computer system 100, the network 130, and the server computer system 132 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., and are referred to hereinafter as "computer programs," or simply "programs." The computer programs typically comprise one or more instructions that are resident at various times in various memory and storage devices in the computer system 100, and that, when read and executed by one or more processors in the computer system 100, cause the computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of tangible signal-bearing media that may be operatively or communicatively connected (directly or indirectly) to the processor or processors, such as the processor 101. The signal-bearing media may include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127), the main memory 102, CD-RW, or diskette; or (3) information conveyed to the computer system 100 by a communications medium, such as through a computer or a telephone network, e.g., the network 130.

Such tangible signal-bearing media, when encoded with or carrying computer-readable and executable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
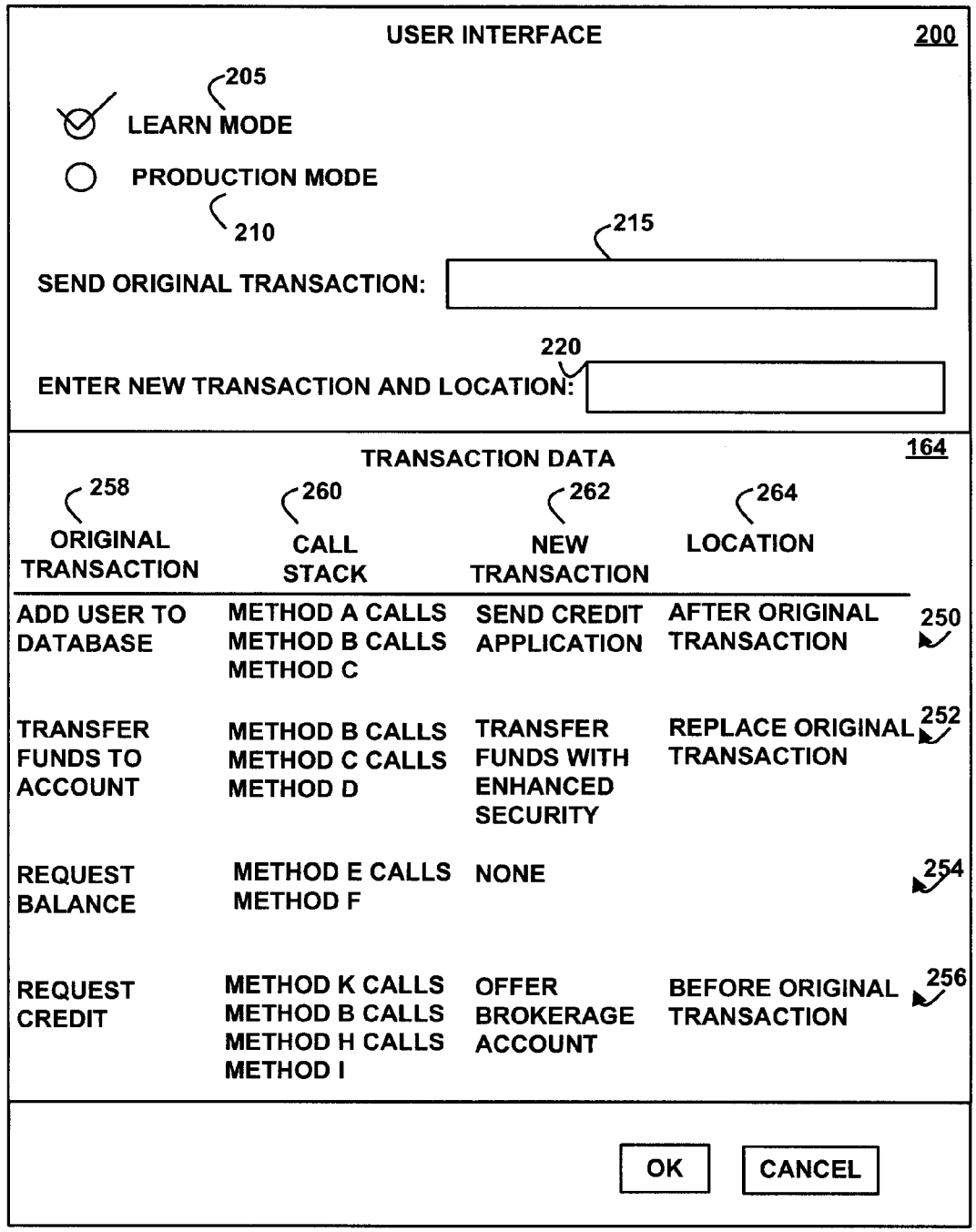
FIG. 2 depicts a block diagram of an example user interface, according to an embodiment of the invention.

FIG. 2 depicts a block diagram of an example user interface 200, according to an embodiment of the invention. The application 150 displays or otherwise presents the user interface 200 via the user terminal 121. The user interface 200 includes a learn mode command 205, a production mode command 210, a send original transaction command 215, an enter new transaction and location command 220, and a display of the transaction data 164.

The transaction data 164 includes example records 250, 252, 254, and 256, each of which includes an original transaction field 258, a call stack field 260, a new transaction field 262, and a location field 264. The original transaction field 258 includes the respective transaction that is available to be sent via the send original transaction command 215 and/or that has been sent by a previous send original transaction command 215. In an embodiment, a transaction requests the storage, retrieval, or modification of the data in the database 154. In another embodiment, a transaction is more complex and may involve multiple operations.

The call stack field 260 includes the contents of the call stack (also know as an invocation stack, execution stack, control stack, function stack, run-time stack, or program stack) of the application 150 at the time that the application 150 sent the transaction identified by the associated original transaction field 258 to the middleware 152. The call stack identified by the call stack field 260 may include entries (also know as stack frames or activation records) for various active programs, subroutines, or methods 156 of the application 150 that are linked together as a result of them calling each other within the same job, process, or thread that executes on the processor 101. (The active methods are those methods that have been called or invoked but have not yet completed execution by returning execution control to their invoker or caller.) Thus, each stack frame corresponds to a call to a method that has not yet terminated with a return. Each stack frame may include, for example, pointers to the programs, subroutines, or methods 156, and their respective internal storage and/or passed parameters. Each stack frame may further include information regarding the classes associated with the programs, subroutines, or methods 156.

A primary purpose for the call stack is to save the location within the application 150 to which each active method 156 should return control when it finishes executing on the processor 101. For example, if the method A calls a method B from multiple different locations within the application 150, the code of method B needs a way to know to which location to return. This problem is typically solved by code for each call within the method storing the address of the instruction after the particular call statement (the "return address") into the call stack. Each task or thread of a process that runs the application 150 has one call stack. But, additional call stacks may be created for signal handling or cooperative multitasking.

Since the call stack is organized as a stack, the calling method pushes the return address onto the stack, and the called method, when it finishes, pops the return address off the call stack (and transfers control to that address). If a called method calls yet another method, it pushes its return address onto the call stack, and so on, with the information stacking up and unstacking as the organization of methods 156 within the application 150 dictates. Adding a method's entry to the call stack is sometimes called winding; conversely, removing entries is called unwinding.

The stack frame at the top of the stack is associated with the currently executing method. In an embodiment, the stack frame includes space for the local variables of the method, the return address back to the method's caller, and the parameter values passed into the method. The memory locations within a frame are often accessed via a register called the stack pointer, which also serves to indicate the current top of the stack. Alternatively, memory within the frame may be accessed via a separate register, often termed the frame pointer, which typically points to some fixed point in the frame structure, such as the location for the return address.

In an embodiment, the stack frame of a method and that of its caller overlap, where the overlap consists of the area where the parameters are passed from the caller to the callee. In an embodiment, the caller pushes each argument onto the stack, thus extending its stack frame, then invokes the callee. In other embodiments, the caller has a preallocated area at the top of its stack frame to hold the arguments it supplies to other methods 156 it calls. This preallocated area is sometimes termed the outgoing arguments area or callout area. In this embodiment, the size of the area is calculated by the compiler to be the largest needed by any called method.

Stack frames are not necessarily all the same size. Different methods 156 have differing numbers of parameters, so that part of the stack frame will be different for different methods 156, although usually fixed across all activations of a particular method. Similarly, the amount of space needed for local variables may be different for different methods 156. In fact, some languages support dynamic allocations of memory for local variables on the call stack, in which case the size of the local variable area varies from activation to activation of a method, and is not known when the method is compiled.

A call stack may serve more or fewer functions, depending on the language, operating system, and environment of the computer system 100. For example, in an embodiment, only the return address and local variables are stored on the call stack while integer parameters are stored on a separate data stack, and floating point parameters are stored on a third stack. In other embodiments, additional functions may be provided by call stacks, as further described below.

Methods often require that values for parameters be supplied to them by the code which calls them, and these parameters may be stored in the call stack. A method frequently needs memory space for storing the values of local variables, which are variables that are known only within the active method and do not retain values after it returns. Each separate activation of a method gets its own separate space in the stack for local data.

In an embodiment, a stack frame includes a field that contains the previous value of the frame pointer register, i.e., the value it had while the caller was executing. The value is saved upon entry to the method and restored for the return. Such a field in the stack frame allows code to access each frame successively underneath the currently executing method's frame.

Some programming languages support nested methods, allowing an inner method to access the context of its outer enclosing method, i.e., the parameters and local variables within the scope of the outer method. Such languages typically allow inner methods to call themselves recursively, resulting in multiple call stacks for the inner methods invocations, all of which point to the same outer method context. This type of call frame is also known as a display. Programming languages that support nested methods use a field in the call stack frame that points to the call stack frame of the outer method that invoked the inner (nested) method. This pointer provides the inner method (as well as any other inner method it may invoke) access to the parameters and local variables of the outer invoking method.

Some object-oriented programming languages store the pointer to the current instance, as well as with function arguments in the call stack, when invoking methods. The pointer to the current instance points at, or contains the address of, the object instance to which the method to be invoked is associated. This pointer is a part of the execution context in object oriented languages and provides access to private data owned by the current object. The pointer links layers used in object-oriented design with layers (types of stack frames) of the run-time call stack.

In an embodiment, machine or software states need to be restored when a method returns. Examples of states include privilege levels, exception handling information, and arithmetic modes, which may be stored in the call stack.

The new transaction field 262 specifies a transaction, command, request, parameters, data, or any combination or multiple thereof, that the middleware 152 inserts into the transaction stream that is sent to the database 154 in response to the finger-printer 160 detecting that the call stack of the application 150 matches the call stack 260 and the transaction that the application 150 sends to the database 154 matches the original transaction 258.

The location field 264 specifies the location or order that the middleware 152 is to insert the new transaction 262 with respect to the original transaction 258 within a stream of transactions that the application 150 and the middleware 152 send to the database 154. For example, the location field 264 may specify that the middleware 152 is to insert the new transaction 262 at a location after the associated original transaction 258 within the stream of transactions that the application 150 and the middleware 152 send to the database 154, as illustrated in the record 250. As another example, the location field 264 may specify that the middleware 152 is to replace the original transaction 258 with the associated new transaction 262 within the stream of transactions that the application 150 and the middleware 152 send to the database 154, as illustrated in the record 252. As another example, the location field 264 may be empty or void, indicating that the new transaction 262 is not used, so that the application 150 and the middleware 152 send the original transaction 258 to the database 154 and do not send a new transaction to the database 154, as illustrated in the record 254. As another example, the location field 264 may specify that the middleware 152 is to insert the new transaction 262 at a location before the associated original transaction 258 within the stream of transactions that the application 150 sends to the database 154, as illustrated in the record 256.

The user may select and send the learn mode command 205 to the application 150 via the user terminal 121. In response to receiving the learn mode command 205, the application 150 displays or presents the transaction data 164 via the user interface 200 and the user terminal 121 and places the application 150 in a learn mode. During the learn mode, the application 150 saves the call stacks 260 in response to receiving requests to send the original transactions 258 to the database 154 via the send original transaction command 215, as further described below with reference to FIG. 3.

The user may select an original transaction from the original transactions 258 via the user interface 200 and the terminal 121 and send the original transaction command 215, which requests the application 150 to send the selected original transaction to the database 154. The user may further select an original transaction 258, enter a new transaction and location for the transaction, and send the new transaction and location command 220 to the application 150, which requests the application 150 to add the entered new transaction and entered location into the transaction data 164, as further described below with reference to FIG. 4.

The user may select and send the production mode command 210 to the application 150 via the user terminal 121. In response to receiving the production mode command 210, the application 150 places the application 150 in a production mode. During the production mode, the application 150 sends a stream of transactions to the database 154 via the middleware 152 and inserts the new transactions 262 at the locations 264 in the transaction stream in response to detecting the original transaction in the transaction stream and detecting a call stack of the application that matches the saved call stack 260, as further described below with reference to FIGS. 5 and 6.

In an embodiment, the application 150 displays the contents of the new transaction field 262 and the location field 264 in response to receiving them from the enter new transaction and location command 220. In another embodiment, the matching algorithm 162 reads the call stack 260 and the original transaction 258 from the transaction data 164, and in response, creates the new transaction 262 and the location 264 based on any appropriate creation technique, such as a neural network or pattern matching rules.

Figure 3:
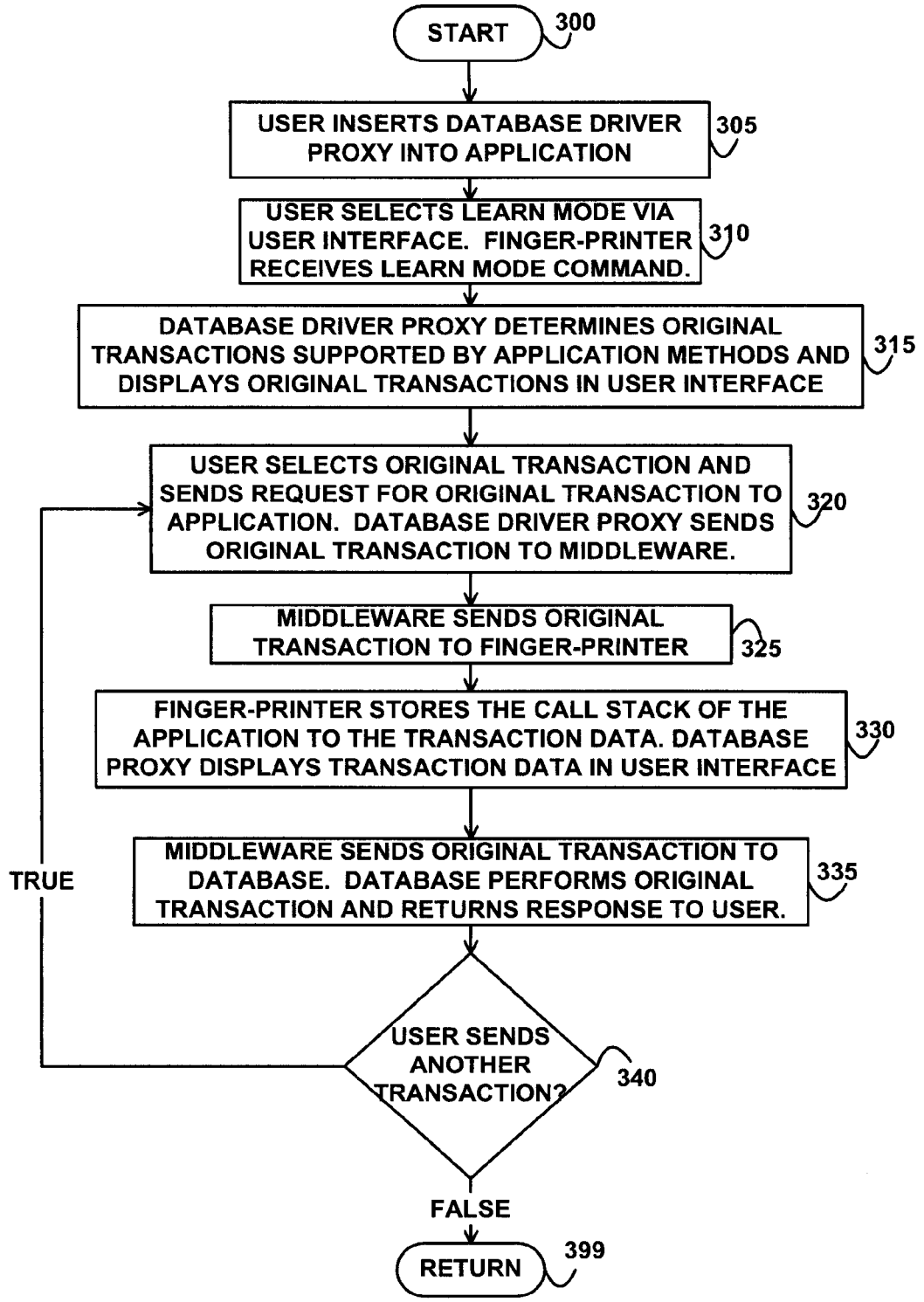
FIG. 3 depicts a flowchart of example logic for processing a transaction in learn mode, according to an embodiment of the invention.

FIG. 3 depicts a flowchart of example logic for processing a transaction in learn mode, according to an embodiment of the invention. Control begins at block 300. Control then continues to block 305 where a user inserts the database driver proxy 158 into the application 150. Control then continues to block 310 where the user selects the learn mode 205 via the user interface 200 and the user terminal 121 and sends a learn mode command to the application 150. The finger-printer 160 in the application 150 receives the learn mode command.

Control then continues to block 315 where, in response to receiving the learn mode command, the database driver proxy 158 in the application 150 determines the original transactions supported by the methods 156 of the application 150 and displays the supported original transactions 258 in the records of the transaction data 164 via the user interface 200.

Control then continues to block 320 where the user selects an original transaction (selects an original transaction 258 from a record in the displayed transaction data 164) and transmits a send original transaction command 215 that includes the selected original transaction to the application 150. The original transaction may include a command (e.g., insert, retrieve, or update a record in the database 154, an identifier of a table in the database 154, and data, such as the data to be inserted, an identifier of a record, or a selection criteria or key for searching the records of the database 154.) The database driver proxy 158 in the application 150 receives the send original transaction command 215 and sends the selected original transaction to the middleware 152.

Control then continues to block 325 where the middleware 152 receives the selected original transaction and sends the original transaction to the finger-printer 160. Control then continues to block 330 where the finger-printer 160 receives the original transaction, finds or determines the call stack of the application 150 that sent the original transaction, and stores the call sack of the application 150 to the transaction data 164 in the call stack field 260 in the record that includes an original transaction 258 that matches the received original transaction.

The database driver proxy 158 further displays or presents the transaction data 164 via the user interface 200 on the user terminal 121, including the original transactions 258 and the call stacks 260. Control then continues to block 335 where the middleware 152 sends the original transaction to the database 154. The database 154 receives and performs the original transaction and returns the results of the original transaction or a response to the original transaction to the user. The response or results are optionally presented or displayed via the user terminal 121.

Control then continues to block 340 where the user decides whether to send another original transaction. If the user decides to send another original transaction, then control returns from block 340 to block 320 where the user selects another original transaction and sends another command, as previously described above.

If the user decides not to send another transaction, then control continues from block 340 to block 399 where the logic of FIG. 3. returns.

Figure 4:
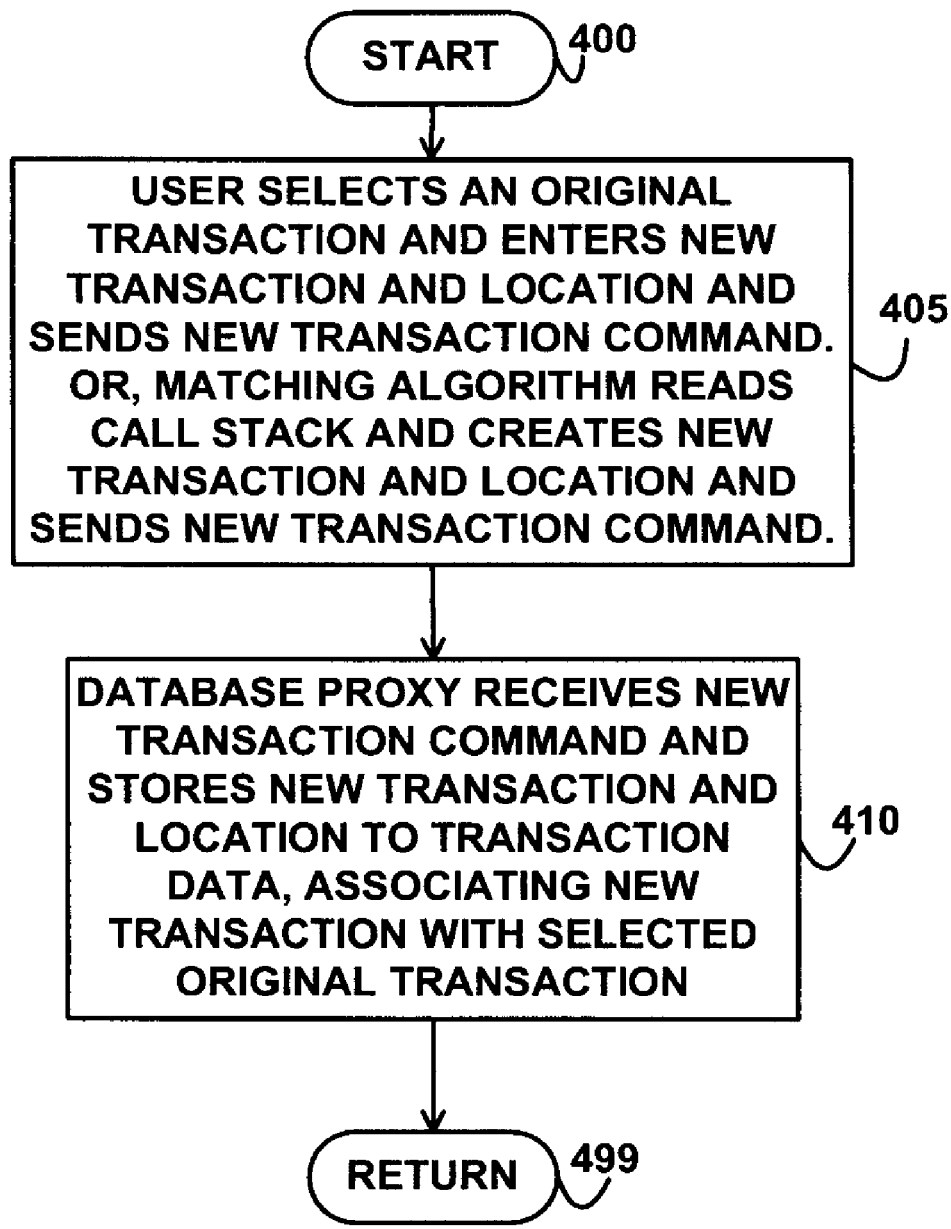
FIG. 4 depicts a flowchart of example logic for associating a new transaction and location with an original transaction and call stack, according to an embodiment of the invention.

FIG. 4 depicts a flowchart of example logic for associating a new transaction and location with an original transaction and call stack, according to an embodiment of the invention. Control begins at block 400. Control then continues to block 405 where the user selects an original transaction 258 via the user interface 200 and the user terminal 121 and enters a specification of new transaction and location of the new transaction with respect to (after, before, or replacement of) the selected original transaction and sends the enter new transaction command 220. In another embodiment, the matching algorithm 162 reads the original transactions 258 and their associated call stacks 260 and, in response, creates a new transaction and location associated with a selected original transaction 258 and sends a new transaction command that specifies the new transaction and location of the new transaction with respect to (after, before, or replacement of) the selected original transaction.

Control then continues to block 410 where the database driver proxy 158 receives the new transaction command and stores the received new transaction and received location in the new transaction field 262 and the location field 264, respectively, in a record in the transaction data 164 that has an original transaction 258 that matches the received original transaction. Thus, the database driver proxy 158 associates the new transaction and location with an original transaction 258 and call stack 260. Control then continues to block 499 where the logic of FIG. 4 returns.

Figure 5:
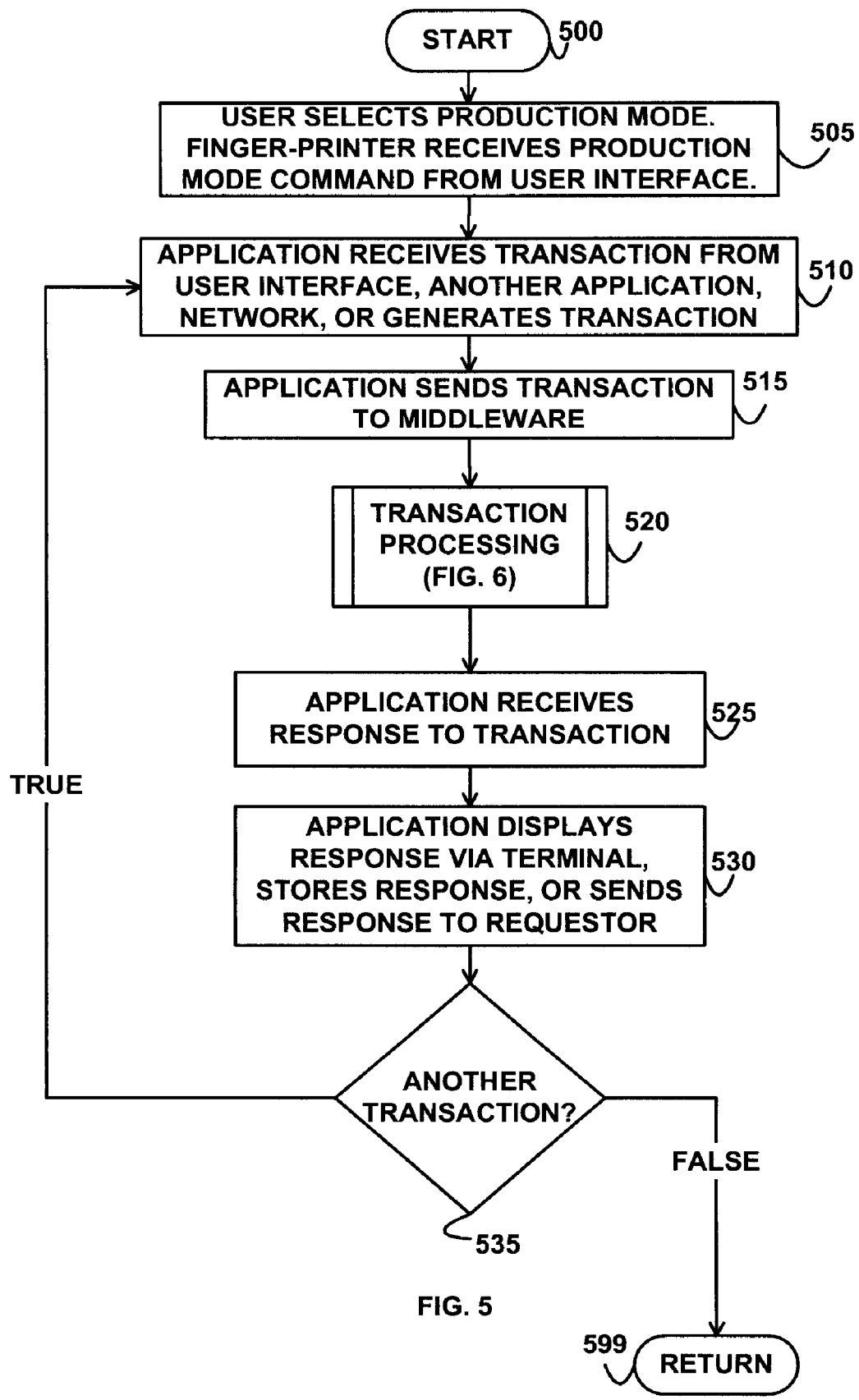
FIG. 5 depicts a flowchart of example processing for processing a transaction in production mode, according to an embodiment of the invention.

FIG. 5 depicts a flowchart of example processing for processing a transaction in production mode, according to an embodiment of the invention. Control begins at block 500. Control then continues to block 505 where the user selects the production mode 210 via the user interface 200 and sends a production mode command. The finger-printer 160 in the database driver proxy 158 receives the production mode command and sets the application 150 into production mode. Control then continues to block 510 where the application 150 receives a transaction from a user interface, from another application at the computer system 100, from the network 130, or from the server computer system 132. In another embodiment, the application 150 generates a transaction internally; for example, the application 150 may periodically back up the database 154 by generating transactions internally that read data from the database 154 and store the data to secondary storage.

Control then continues to block 515 where the application 150 sends the transaction to the middleware 152. Control then continues to block 520 where the transaction is processed by the middleware 152, as further described below with reference to FIG. 6. Control then continues to block 525 where the application 150 receives a response to the transaction or receives results for the transaction from the database 154.

Control then continues to block 530 where the application 150 displays or presents the response or results via the terminal 121, stores the response or results to a storage device, or sends the response or results to the requester or originator of the transaction, e.g., the computer system 132 connected to the network 130 or to another application within the computer system 100. Control then continues to block 535 where a decision is made by the user, a requester, the application 150, or an originator of transactions whether another transaction is to be sent.

If the determination at block 535 is true, then another transaction is to be sent, so control returns to block 510 where the application 150 receives and processes another transaction, as previously described above.

If the determination at block 535 is false, then another transaction is not to be sent, so control continues to block 599 where the logic of FIG. 5 returns.

Figure 6:
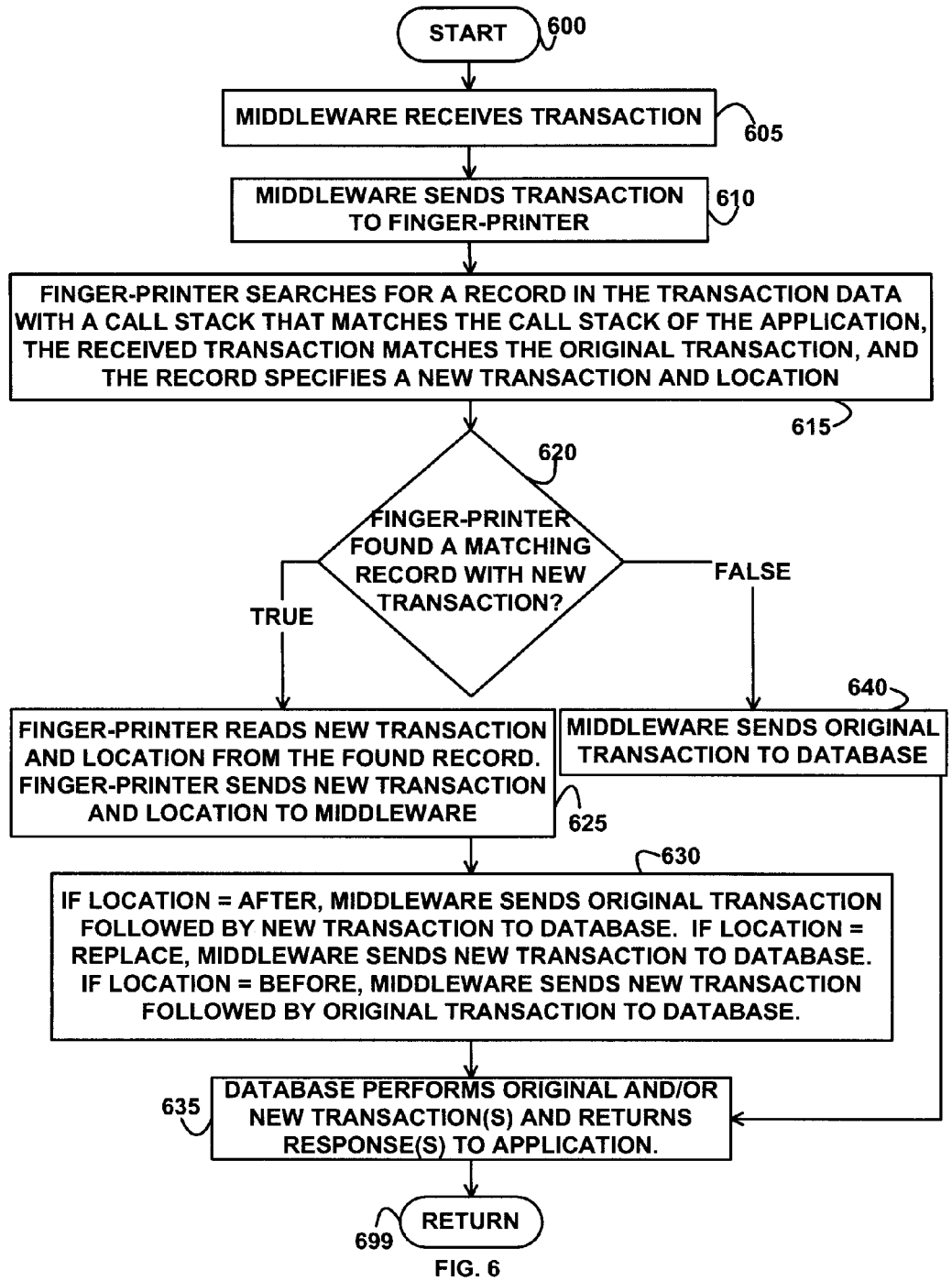
FIG. 6 depicts a flowchart of further example processing for processing a transaction in production mode, according to an embodiment of the invention.

FIG. 6 depicts a flowchart of further example processing for processing a transaction in production mode, according to an embodiment of the invention. Control begins at block 600. Control then continues to block 605 where the middleware 152 receives the transaction from the application 150, which was sent as previously described above with reference to block 515 (FIG. 5). Control then continues to block 610 where the middleware 152 sends the transaction to the finger-printer 160, and the finger-printer 160 receives the transaction.

Control then continues to block 615 where, in response to receiving the transaction, the finger-printer 160 searches for a record in the transaction data 164 with a call stack 260 that matches the call stack of the application 150 that sent the transaction, with an original transaction 258 that matches the received transaction, and with a new transaction 262 and location 264 that specify a new transaction and location (are not empty). In various embodiments, the call stack of the application 150 matches the call stack 260 of a record in the transaction data 164 if the method names in the respective call stacks match, if the order of the method calls in the respective call stacks match, if selected parameters in the respective call stacks match, if the local variable names in the respective call stacks match, if the values of the matching local variable names match, if the return addresses of selected methods in the respective call stacks match, if selected data in the respective call stacks match, or any combination or multiple thereof. In various embodiments, the received transaction matches the original transaction 258 if the transaction names match, if the names of the database tables to which the respective transactions are directed match, if a key value specified by the respective transactions match, if the requestors that originated or requested the respective transactions match, or any combination or multiple thereof.

Control then continues to block 620 where the finger-printer 160 determines whether the search (of block 615) found a record in the transaction data 164 with a call stack 260 that matches the call stack of the application 150 that sent the received transaction, the received transaction matches the original transaction 258 in the record, and the record specifies a new transaction 262 and a location 264. If the determination at block 620 is true then the search (of block 615) found a record in the transaction data 164 with a call stack 260 that matches the call stack of the application 150, the received transaction matches the original transaction 258 in the record, and the record specifies a new transaction 262 and a location 264, so control continues to block 625 where the finger-printer 160 reads the new transaction 262 and the location 264 of the new transaction 262 from the found record. The finger-printer 160 sends the new transaction 262 and the location 264 of the new transaction 262 with respect to the original transaction 258 to the middleware 152.

Control then continues to block 630 where the middleware 152 determines where to insert the new transaction into the instruction stream based on the location 264 of the new transaction 262 specified by the found record. If the location field 264 in the found record specifies that the location of the new transaction is to be after the original transaction (e.g., as illustrated in the record 250 of the transaction data 164), then the middleware 152 sends the original transaction to the database 154 and then (subsequently) sends the new transaction 264 specified by the found record to the database 154. Thus, the middleware 152 sends the new transaction 262 after the original transaction in time to the database 154, and the database 154 processes the transactions in the order that they are received.

If the location 264 in the found record specifies that the new transaction 262 is to replace the original transaction (e.g., as illustrated in the record 252 of the transaction data 164), then the middleware 152 sends the new transaction 262 to the database 154 instead of, or in replace of, the original transaction, which is not sent, even though the original transaction was sent by the application 150.

If the location 264 specifies that the location of the new transaction 262 is be in the transaction stream before the original transaction (e.g., as illustrated in the record 256 of the transaction data 164), then the middleware 152 sends the new transaction 262 to the database 154 before the original transaction in time. That is, the middleware 152 sends the new transaction 262 to the database 154 and subsequently sends the original transaction to the database 154.

Control then continues to block 635 where the database 154 performs the original transaction (if received) and the new transaction, in the order that they are received, and returns the response(s) or result(s) of the original transaction and/or the new transaction to the application 150. Control then to block 699 where the logic of FIG. 6 returns.

If the determination of block 620 is false, then the search (of block 615) did not find a record in the transaction data 164 with a call stack that matches the call stack of the application 150, or the received transaction did not match the original transaction 258, or the record does not specify a new transaction 262 and location 264, so control continues to block 640 where the finger-printer 160 sends the original transaction to the database 154. Control then continues to block 635 where the database 154 performs the original transaction and returns the response or result of the original transaction to the application 150. Control then to block 699 where the logic of FIG. 6 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method comprising:
   receiving an original transaction from an application during a production mode of the application;
   determining whether a call stack of the application during the production mode matches a call stack of the application during a learn mode;
   if the call stack of the application during the production mode matches the call stack of the application during the learn mode, inserting a new transaction in a transaction stream sent to a database and sending a result of the new transaction to the application; and
   if the call stack of the application during the production mode does not match the call stack of the application during the learn mode, sending the original transaction to the database without sending the new transaction to the database and sending a result of the original transaction to the application.

2. The method of claim 1, further comprising:
   receiving a selection of the original transaction; and
   in response to receiving the selection of the original transaction, saving the call stack of the application that sends the original transaction during the learn mode of the application.

3. The method of claim 2, further comprising:
   receiving a specification of the new transaction and a location of the new transaction with respect to the original transaction, wherein the inserting inserts the new transaction at the location in the transaction stream.

4. The method of claim 3, wherein the location is before the original transaction in the transaction stream.

5. The method of claim 3, wherein the location is after the original transaction in the transaction stream.

6. The method of claim 3, wherein the location specifies replacing the original transaction in the transaction stream.

7. The method of claim 3, wherein the determining further comprises:
   determining whether method names in the call stacks of the learn mode and the production mode match.

8. A storage medium encoded with instructions, wherein the instructions when executed comprise:
   receiving a selection of an original transaction;
   in response to receiving the selection of the original transaction, saving a call stack of the application that sends the original transaction during a learn mode of the application;
   receiving the original transaction from an application during a production mode of the application;
   determining whether a call stack of the application during the production mode matches a call stack of the application during a learn mode;
   if the call stack of the application during the production mode matches the call stack of the application during the learn mode, inserting a new transaction in a transaction stream sent to a database and sending a result of the new transaction to the application; and
   if the call stack of the application during the production mode does not match the call stack of the application during the learn mode, sending the original transaction to the database without sending the new transaction to the database and sending a result of the original transaction to the application.

9. The storage medium of claim 8, further comprising:
   receiving a specification of the new transaction and a location of the new transaction with respect to the original transaction, wherein the inserting inserts the new transaction at the location in the transaction stream.

10. The storage medium of claim 9, wherein the location is before the original transaction in the transaction stream.

11. The storage medium of claim 9, wherein the location is after the original transaction in the transaction stream.

12. The storage medium of claim 9, wherein the location specifies replacing the original transaction in the transaction stream.

13. The storage medium of claim 9, wherein the determining further comprises:

determining whether method names in the call stacks of the learn mode and the production mode match.

14. The storage medium of claim 13, wherein the determining further comprises:
determining whether a call order of the method names in the call stacks of the learn mode and the production mode match.

15. The storage medium of claim 13, wherein the determining further comprises:
determining whether return addresses in the call stacks of the learn mode and the production mode match.

16. A computer system comprising:
a processor; and
memory connected to the processor, wherein the memory encodes instructions that when executed by the processor comprise:
receiving a selection of an original transaction,
in response to receiving the selection of the original transaction, saving a call stack of the application that sends the original transaction during a learn mode of the application,
receiving a specification of a new transaction and a location of the new transaction with respect to the original transaction,
receiving the original transaction from an application during a production mode of the application,
determining whether a call stack of the application during the production mode matches a call stack of the application during a learn mode,
if the call stack of the application during the production mode matches the call stack of the application during the learn mode, inserting a new transaction in a transaction stream sent to a database and sending a result of the new transaction to the application, and
if the call stack of the application during the production mode does not match the call stack of the application during the learn mode, sending the original transaction to the database without sending the new transaction to the database and sending a result of the original transaction to the application.

17. The computer system of claim 16, wherein the determining further comprises:
determining whether method names and a call order of the method names in the call stacks of the learn mode and the production mode match.

18. The computer system of claim 17, wherein the determining further comprises:
determining whether return addresses in the call stacks of the learn mode and the production mode match.

19. The computer system of claim 17, wherein the determining further comprises:
determining whether parameters in the call stacks of the learn mode and the production mode match.

20. The computer system of claim 17, wherein the determining further comprises:
determining whether local variables in the call stacks of the learn mode and the production mode match.

* * * * *